US011695944B2

(12) United States Patent
Watanabe (10) Patent No.: US 11,695,944 B2
(45) Date of Patent: Jul. 4, 2023

(54) VIDEO CODING DEVICE AND METHOD

(71) Applicant: OmniVision Technologies, Inc., Santa Clara, CA (US)

(72) Inventor: Hitoshi Watanabe, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/469,724

(22) Filed: Sep. 8, 2021

(65) Prior Publication Data

US 2023/0070021 A1 Mar. 9, 2023

(51) Int. Cl.
| | |
|---|---|
| *H04N 19/164* | (2014.01) |
| *H04N 11/02* | (2006.01) |
| *H04N 19/30* | (2014.01) |
| *H04N 19/46* | (2014.01) |
| *H04N 19/176* | (2014.01) |
| *H04N 19/513* | (2014.01) |
| *H04N 19/70* | (2014.01) |
| *H04N 19/139* | (2014.01) |
| *H04N 19/146* | (2014.01) |

(52) U.S. Cl.
CPC .......... *H04N 19/30* (2014.11); *H04N 19/139* (2014.11); *H04N 19/146* (2014.11); *H04N 19/176* (2014.11); *H04N 19/46* (2014.11); *H04N 19/513* (2014.11); *H04N 19/70* (2014.11)

(58) Field of Classification Search
CPC .... H04N 19/30; H04N 19/139; H04N 19/146; H04N 19/176; H04N 19/46; H04N 19/513; H04N 19/70

USPC ..................................................... 375/240.16
See application file for complete search history.

(56) References Cited

U.S. PATENT DOCUMENTS

| | | | |
|---|---|---|---|
| 2009/0147856 A1* | 6/2009 | Song ..................... | H04N 19/15 375/E7.076 |
| 2017/0134454 A1* | 5/2017 | Bae ....................... | H04N 21/234 |
| 2018/0248806 A1* | 8/2018 | Burnley ............... | H04L 1/0002 |
| 2018/0367800 A1* | 12/2018 | Damnjanovic ....... | H04N 19/146 |
| 2019/0281501 A1* | 9/2019 | Berg ..................... | H04L 1/00 |
| 2019/0306525 A1* | 10/2019 | Edpalm ................ | H04N 19/137 |

\* cited by examiner

*Primary Examiner* — Albert Kir
(74) *Attorney, Agent, or Firm* — Cozen O'Connor (57) ABSTRACT

A video encoding method includes (i) determining a current bit rate of a communication channel between a destination device and a source device that stores an input video frame, and (ii) generating a current reconstructed frame and an encoded bitstream at least in part via inter-frame coding of a current input video frame of a sequence of input video frames using a previously-generated reconstructed frame generated at least in part via inter-frame coding of a previous input video frame. The current reconstructed frame is a compressed version of the current input video frame. When both (i) a subsequent bit rate, determined after said inter-frame coding, is less than a threshold and (ii) the current bit rate exceeds the threshold, the method includes: (a) generating a downscaled reconstructed frame at least in part by downscaling the current reconstructed frame; and (b) appending the encoded bitstream with a bit sequence representing the downscaled reconstructed frame.

22 Claims, 5 Drawing Sheets

VIDEO CODING DEVICE AND METHOD

BACKGROUND

Seamless video streaming under dynamically changing network bandwidth requires an ability to quickly and precisely adjust bit rates of data transmitted between a source device and a destination device. One method dynamically adjusting bit rate is reference picture resampling, which includes dynamically adjusting frame resolution of transmitted data. Some methods for dynamically adjusting frame resolution are limited by being applicable only at bitstream boundaries. Reference picture resampling methods allow resolution changes within a bitstream, but have high requirements for amount of reference data to be read, pixel locations to search, and resampling operations, each of which increases power consumption. Such methods also require additional interpolation filters and hence logic gates, which increases cost.

SUMMARY OF THE EMBODIMENTS

Embodiments disclosed herein remedy the above-mentioned deficiencies.

In a first aspect, a video encoding method includes adding, to a bitstream, an indicator of whether a frame resolution is to be reduced. The method also includes, when said indicator indicates that the frame resolution is to be reduced, encoding a block of video data on a current video frame without motion compensation.

In a second aspect, a video decoding method includes receiving, as a syntax element from a bitstream, an indicator of whether a frame resolution is to be reduced. The method also includes, when said indicator indicates that the frame resolution is to be reduced, decoding a block of video data on a video frame without motion compensation.

In a third aspect, a video encoding method includes (A) determining a current bit rate of a time-varying bit rate of a communication channel between a destination device and a source device that stores at least one input video frame of a sequence of input video frames; and (B) generating a current reconstructed frame and an encoded bitstream in part via inter-frame coding of a current input video frame of the sequence of input video frames using a previously-generated reconstructed frame generated at least in part via inter-frame coding of a previous input video frame of the sequence of input video frames. The current reconstructed frame is a compressed version of the current input video frame. When both (i) a subsequent bit rate of the communication channel, determined after said inter-frame coding, is less than a threshold value and (ii) the current bit rate exceeds the threshold value: (a) generating a downscaled reconstructed frame at least in part by reducing a resolution of input video frame; and (b) appending the encoded bitstream with a bit sequence representing the downscaled reconstructed frame. The method may also include at least one of transmitting the encoded bitstream from the source device to the destination device and receiving the encoded bitstream sent from the source device to the destination device.

In a fourth aspect, a video streaming or receiving device includes a processor and a memory. The memory stores non-transitory computer-readable instructions that, when executed by the processor, control the processor execute the method of the third aspect.

DETAILED DESCRIPTION OF THE EMBODIMENTS

Figure 1:
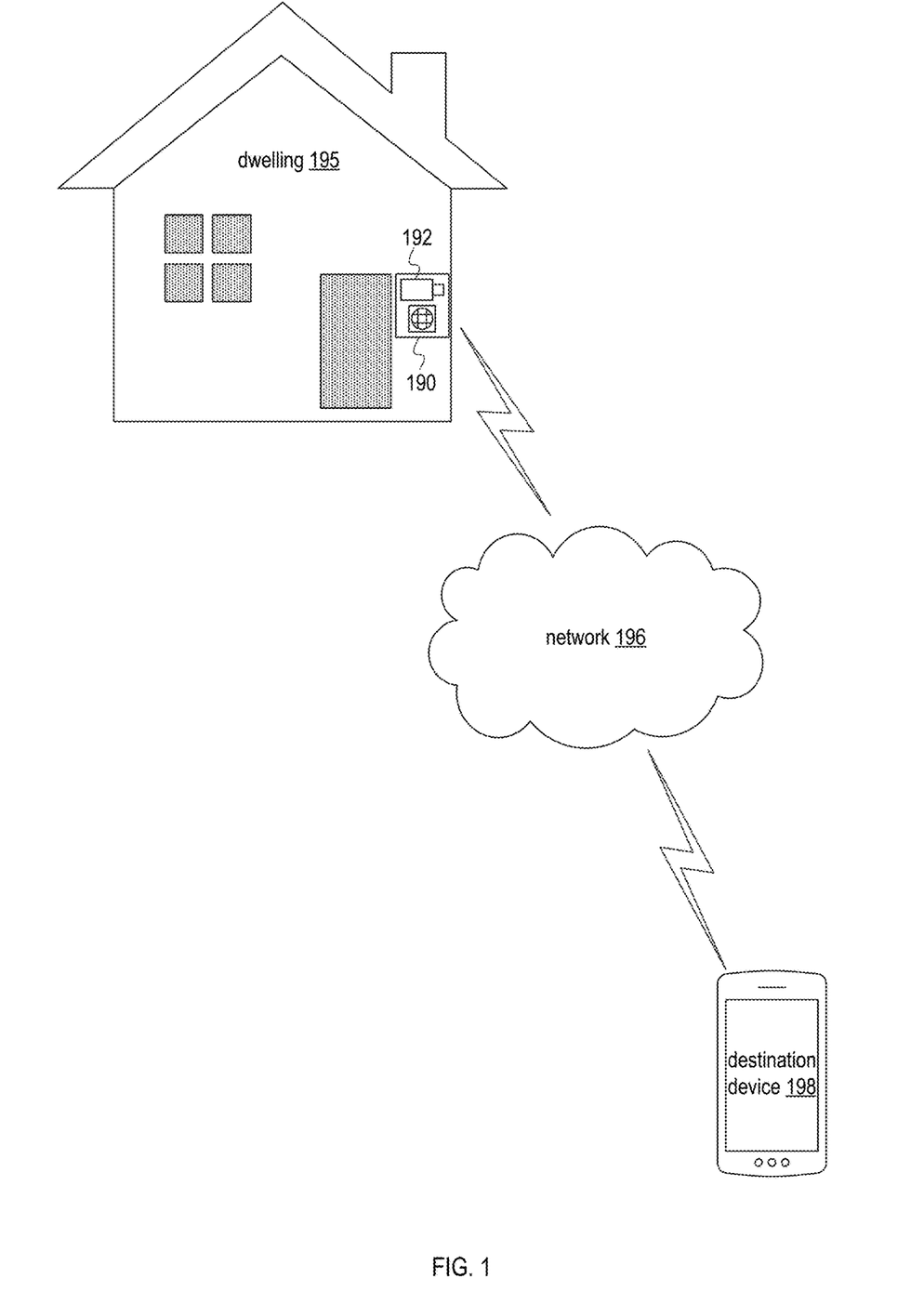
FIG. 1. is a schematic of a house equipped with a security device that includes a camera.
Figure 2:
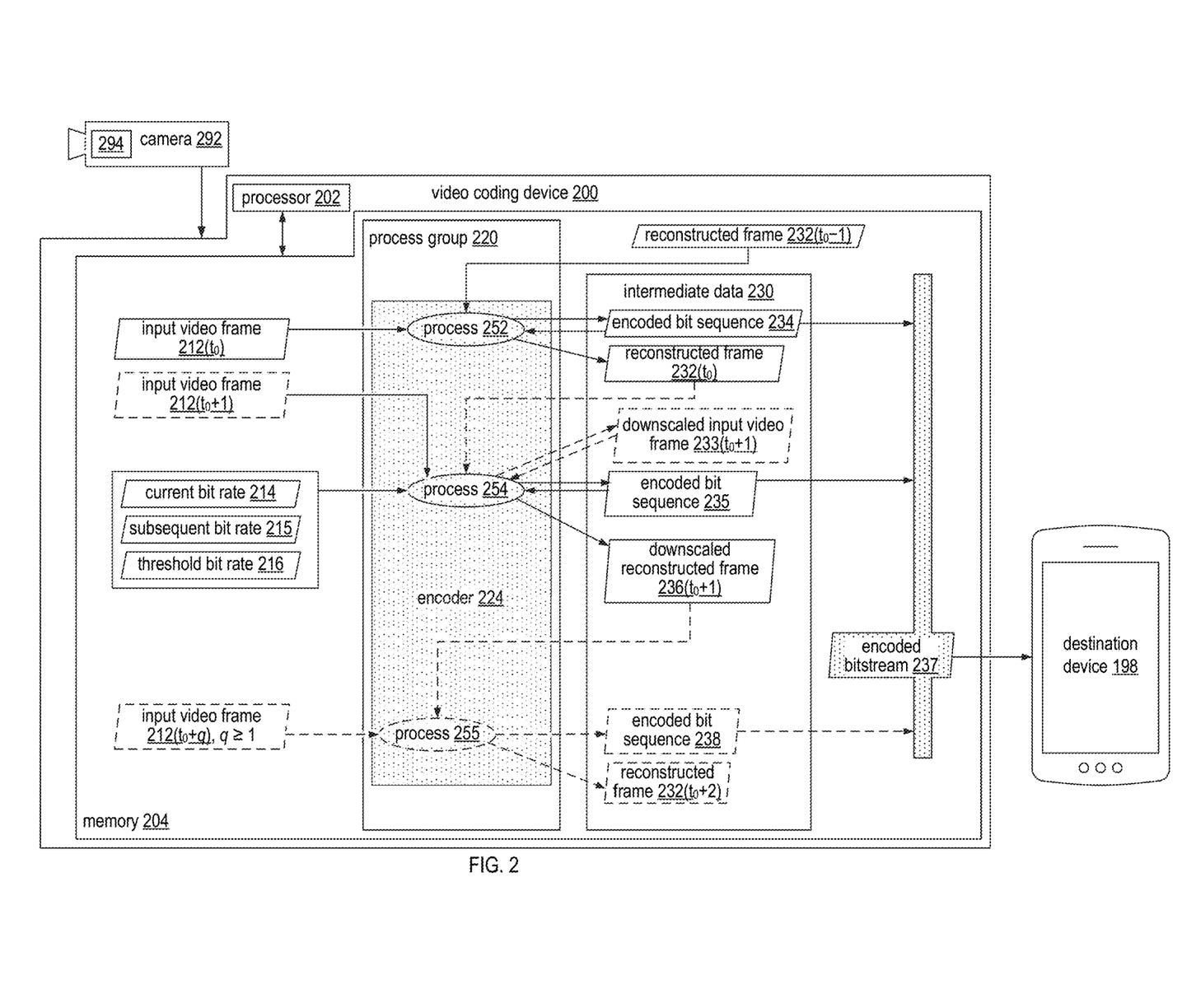
FIG. 2 is a schematic of a video coding, in an embodiment; the video coding device is an example of the security device of FIG. 1.

FIG. 1 is a schematic of a dwelling 195 equipped with a security device 190 that includes a camera 192. Security device 190 is communicatively coupled to a destination device 198 via a network 196. FIG. 2 is a schematic of a video coding device 200 in a use scenario in which device 200 streams video data generated by a camera 292 to a destination device 198. Camera 292 includes an image sensor 294. Camera 192 is an example of camera 292.

Video coding device 200 includes a processor 202 and a memory 204. In embodiments, video coding device 200 also includes at least one of image sensor 294 and camera 292. In such embodiments, examples of video coding device 200 include personal computers, mobile devices, security cameras, and security devices, such as security device 190 and destination device 198. Video coding device 200 may be a device that at least one of (a) encodes and streams video data, and (b) a device that receives and decodes video data.

Memory 204 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 204 may be integrated into processor 202. Memory 204 includes process group 220, which includes machine-readable instructions. Processor 202 is adapted to execute the machine-readable instructions to perform functions of video coding device 200 as described herein.

Memory 204 also stores at least one input video frame 212, bit rates 214, a threshold bit rate 216, intermediate data 230, and an encoded bitstream 237. Process group 220 processes input video frames 212, bit rates 214, and intermediate data 230 to produce encoded bitstream 237. In embodiments, process group 220 is, or includes, software, and may implement at least one of encoding, decoding, and reconstruction process.

Intermediate data 230 includes at least one of: an encoded bit sequence 234, at least one reconstructed frame 232 (i.e., a previously generated reconstructed frame used as a reference frame for predicting subsequent frames), an encoded bit sequence 235, a downscaled reconstructed frame 236, and an encoded bit sequence 238. In embodiments, intermediate data includes an encoded bit sequence 235. In embodiments, memory 204 forms a buffer for storing at least part of intermediate data 230.

Video coding device 200 receives input video frames 212 from camera 292. Process group 220 includes an encoder 224. From each input video frame 212 and a previously generated reconstructed frame 232, encoder 224 produces a respective encoded bitstream and a reconstructed frame 232 via respective encoder processes 252, 254, and 255. Video coding device 200 adds each encoded bit sequence, e.g., at least one of encoded bit sequences 234, 235, and 238, to an encoded bitstream 237. Video coding device 200 transmits encoded bitstream 237 to destination device 198. Encoded bitstream 237 may be formatted in any one of a number of video coding formats such as AV1 and VVC/H.266, or any proprietary video coding format.

Camera 292 is communicatively coupled to memory 204 and is configured to generate input video frames 212, each of which are differentiated by a respective frame-counter index t, such as $t_0 \pm q$, where each of $t_0$ and q is a non-negative integer and $t_0$ denotes a reference frame-counter index. Herein, frame-counter index t is also referred to as a frame index t. In embodiments, frame-counter index t is a temporal sequencing index that denotes a temporal sequencing of video frames 212, such that video frames $212(t_0)$ and $212(t_0+1)$ are temporally sequential. Reconstructed frames 232 and downscaled reconstructed frames 236 are also indexed by $t_0 \pm q$, which means they are derived from an input video frame 212 having the same index. In embodiments, memory 204 stores multiple input video frame 212 simultaneously, for example, between two and five, as suggested in FIG. 2 for purposes of explaining the functionality of video coding device 200. In embodiments, memory 204 stores one and only one input video frame 212 at any given time.

Figure 3:
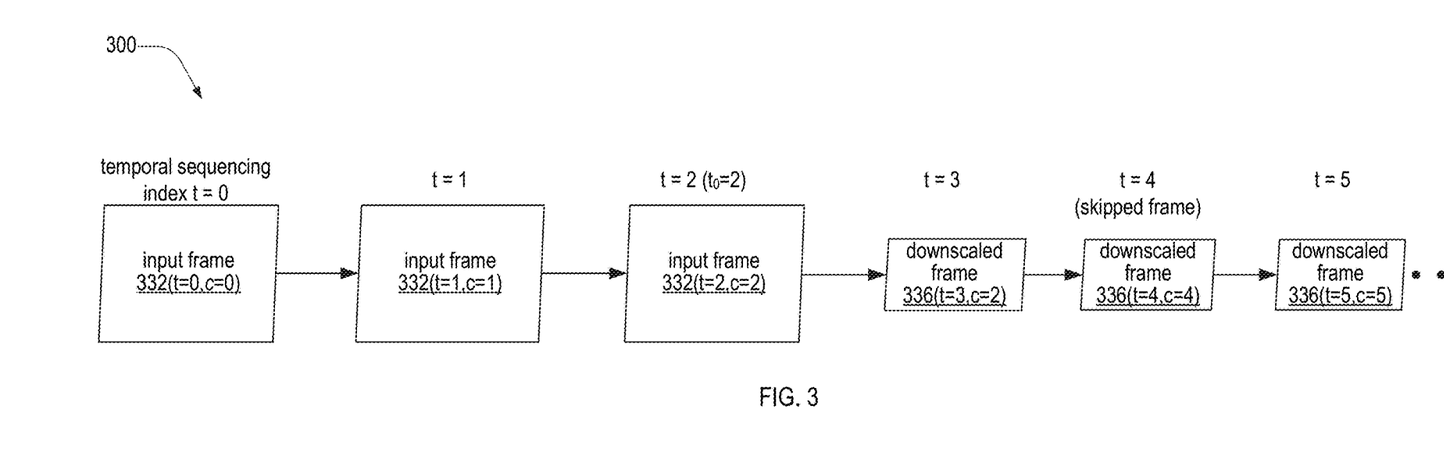
FIGS. 3 and 4 are respective schematics of a decoded video frame sequence obtained by decoding an encoded bitstream transmitted by the video coding device of FIG. 2, in embodiments.

FIG. 3 is a schematic of video frame sequence 300. In embodiments, video streaming device 200 generates video frame sequence 300. In embodiments, video frame sequence is obtained by decoding encoded bitstream 237 at destination device 198.

Frame sequence 300 includes a plurality of input frames 332 and downscaled frames 336 corresponding to input video frames 212. In embodiments, input frames 332 and downscaled frames 336 are respective examples of reconstructed frames 232 and 236 after being encoded by video coding device 200, transmitted to destination device 198 as encoded bitstream 237, and decoded by destination device 198. Decoded frames 332 and 336 are used as reference frame for inter prediction during a decoding process performed on destination device 198.

Each of input frames 332 and downscaled frames 336 is indexed by two indices (t,c), that is, frame-counter index t and a content index c. Temporal indices of frames of FIG. 2 are in terms of a reference frame-counter index $t_0$. In FIG. 3, $t_0=2$. Content index c denotes the contents of each frame 332, 336 by referring time index t of input video frame 212, FIG. 2. The content of input frames 332(0, 0), 332(1, 1), and 332(2, 2) derive from input video frames 212(0, 1, 2) respectively. The content of downscaled frames 336(3, 2), 336(4, 4), and 336(5, 5) derive from input video frames 212(2, 4, 5) respectively.

Destination device 198 displays video frame sequence 300 in order according to frame-counter index t, first introduced in FIG. 2 as being an attribute of input video frames 212, reconstructed frames 232, 236. It is understood that the encoded bitstream (237 or 239), which device 200 decodes to display video frame sequence 300, need not include frame-counter index t. The resolution of video frame sequence 300 decreases between frame-counter indices t=2 and t=3, and the content of two consecutive frames of video frame sequence 300—frames 332(2) and 336(2) are derived from a same input frame: input video frame 212(2).

Hence, video frame sequence 300 includes a frame jump between sequencing indices t=3 and t=4, such that no frame of video frame sequence 300 is derived from the content of input video frame 212(3). Skipping input video frame 212(3) at frame-counter index t=3, when the resolution change occurs during encoding (q≥1 for input video frame 212 at encoder process 255, FIG. 2), obviates the need for additional interpolation filters and associated logic gates in video coding device 200 associated with conventional reference picture resampling, while also retaining the benefits.

Figure 4:
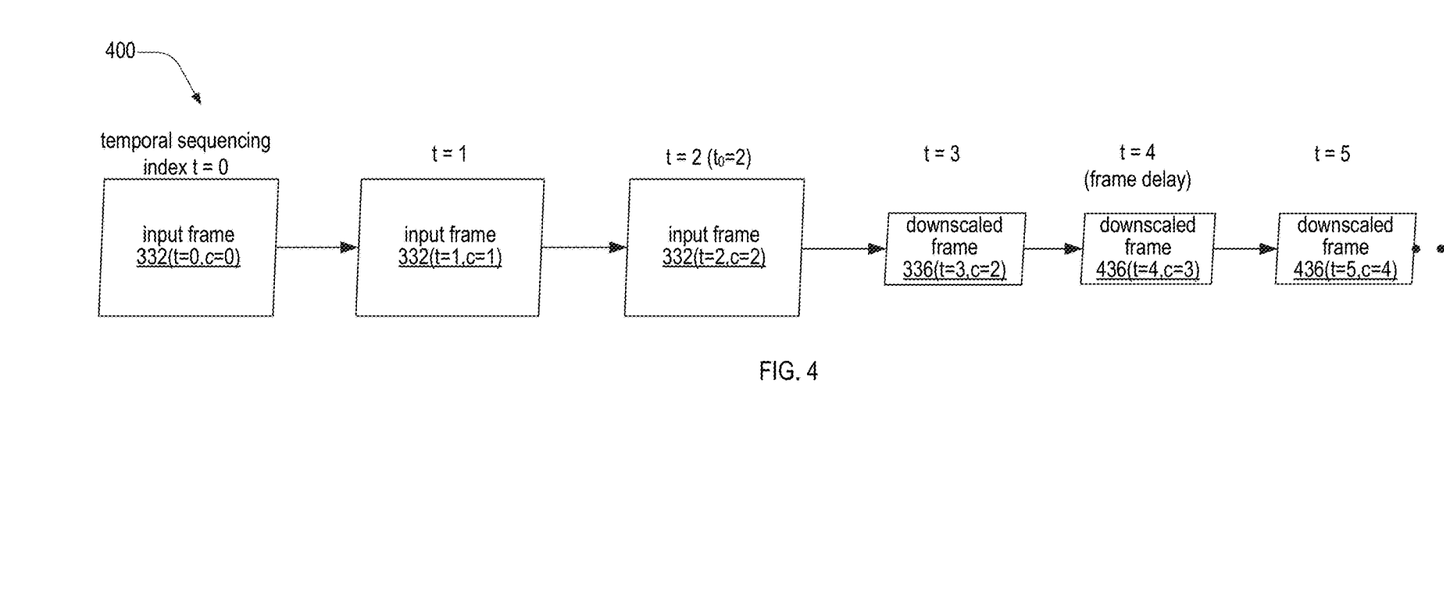

FIG. 4 is a schematic of video frame sequence 400. In embodiments, video streaming device 200 generates video frame sequence 400. In embodiments, video frame sequence 400 is obtained by decoding encoded bitstream 237 at destination device 198. As in FIG. 3, reference frame-counter index $t_0=2$.

Video frame sequence 400 includes input frames 332, downscaled frame 336(2,3), and downscaled input frames 436. Downscaled input frames 436 are examples of downscaled reconstructed frame 236 after being encoded by video coding device 200, transmitted to destination device 198 as encoded bitstream 237, and decoded by destination device 198.

Each downscaled input frame 436 is indexed by two indices (t,c), that is, frame-counter index t and a content index c. Content index c denotes the contents of each downscaled input frame 436 by referring to the frame-counter index of input video frame 212, FIG. 2. The content of downscaled input frames 436(4,4) and 436(4,5) derive from input video frames 212(2, 4, 5) respectively.

Destination device 198 displaces video frame sequence in order according to frame-counter index t, first introduced in FIG. 2 as being an attribute of input video frames 212, reconstructed frames 232, 236. The resolution of video frame sequence 400 decreases between frame-counter indices t=2 and t=3, and the content of two consecutive frames of video frame sequence 400—frames 432(2) and 436(2) are derived from a same input frame: input video frame 212(2). Video frame sequence 400 includes a frame delay beginning at frame-counter index t=4, such that content index c equals (t−1) for t greater than equal to four.

Hence, video frame sequence 400 is delayed by one frame starting at sequencing indices t=3. Skipping input video frame 212(3) at frame-counter index t=3, when the resolution change occurs during encoding (q≥1 for input video frame 212 at encoder process 255, FIG. 2), obviates the need for additional interpolation filters and associated logic gates in video coding device 200 associated with conventional reference picture resampling, while also retaining the benefits.

Figure 5:
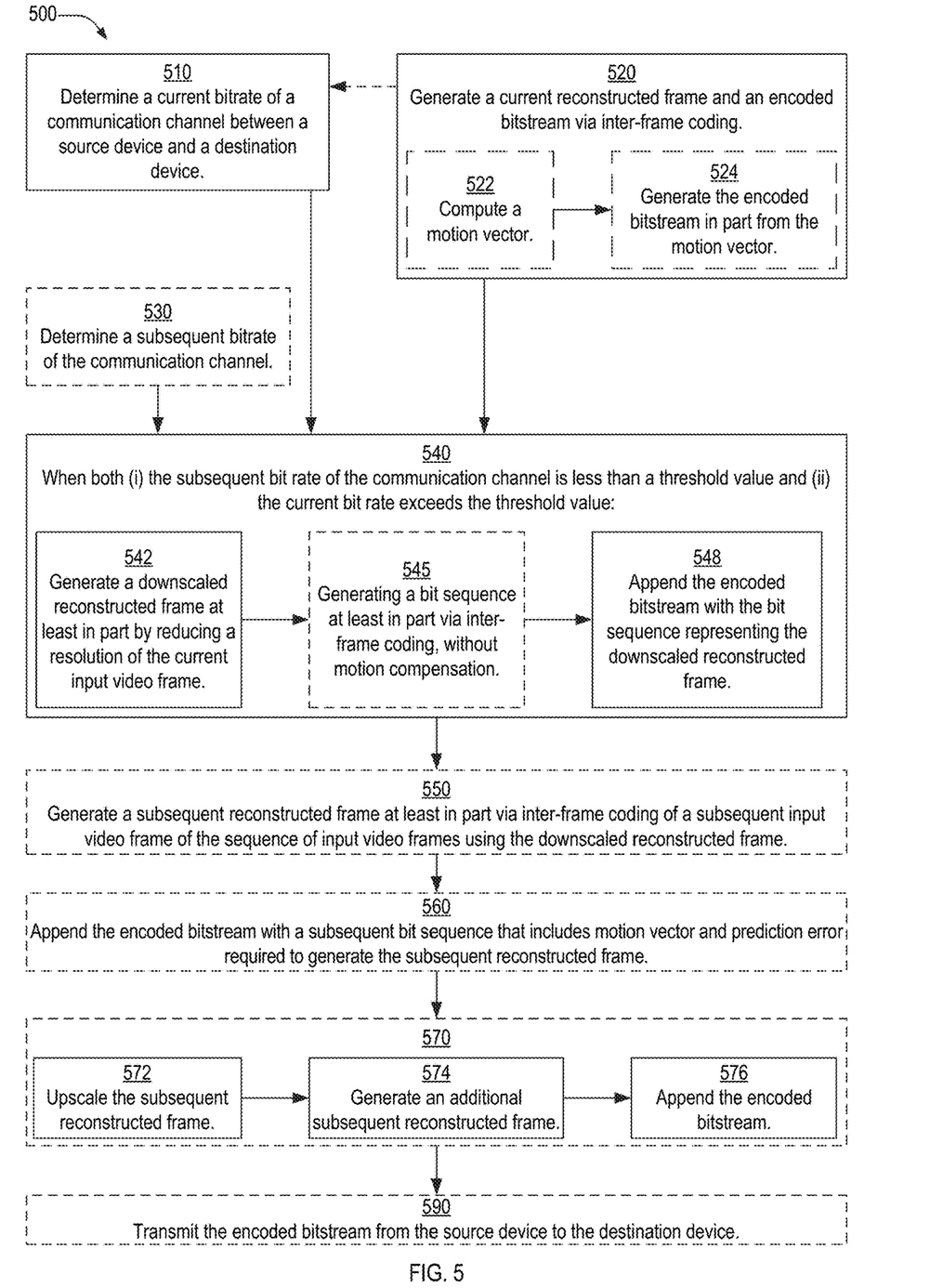
FIG. 5 is a flowchart illustrating an embodiment of a video streaming/receiving method, which may be implemented by the video streaming/receiving device of FIG. 2.

FIG. 5 is a flowchart illustrating a video encoding method 500. In embodiments, at least part of method 500 is implemented by one of video coding device 200, destination device 198, or a combination thereof. In embodiments, at least part of method 500 is implemented by processor 202 executing computer-readable instructions of process group 220. In embodiments, at least part of method 500 is implemented by a processor if destination device 198 executing computer-readable instructions of software stored in a memory of destination device 198. Method 500 includes steps 510, 520, and 540. Method 500 may also include at least one of steps 530 and 590.

Step 510 includes determining a current bit rate of a time-varying bit rate of a communication channel between a destination device and a source device that stores at least one input video frame of a sequence of input video frames. In an example of step 510, either one of video coding device 200 and destination device 198 determines current bit rate 214, where devices 200 and 198 are the respective source device and destination device of method 500.

Step 520 includes generating a current reconstructed frame and an encoded bitstream at least in part via inter-frame coding of a current input video frame of the sequence of input video frames using a previously-generated reconstructed frame generated at least in part via inter-frame coding of a previous input video frame of the sequence of input video frames. The current reconstructed frame is a compressed version of the current input video frame and, in embodiments, is stored and used as a reference frame to encode subsequent frames. In embodiments, step 520 precedes step 510, and in step 510, the current bit rate is determined at least in part from the encoded bit stream.

In an example of step 520, encoder 224 generates reconstructed frame 232($t_0$) and encoded bit sequence 234 at least in part via inter-frame coding of input video frame 212($t_0$) using reconstructed frame 232($t_0$−1), as illustrated at process 252 in FIG. 2. Reconstructed frame 232($t_0$−1) is a previously-generated reconstructed frame, generated by encoder 224 that had decoded a previous input video frame 212($t_0$−1), not shown in FIG. 2, in a previous iteration. Reconstructed frame 232($t$), is a compressed version input video frame 212($t_0$).

In embodiments, step 520 includes steps 522 and 524. Step 522 includes computing a motion vector between the previously-generated reconstructed frame and the current video input frame. Step 524 includes generating the encoded bitstream from the motion vector, the current video input frame, and the previously-generated reconstructed frame at least in part via inter-frame coding. Examples of the previously-generated reconstructed frame and the current video input frame are reconstructed frame 232($t_0$−1) and input video frame 212($t_0$) respectively. When destination device 198 executes step 524, destination device 198 parses the motion vector from the encoded bitstream.

Step 530 includes determining a subsequent bit rate of the communication channel. Step 530 may be executed after step 520. In an example of step 530, either one of video coding device 200 and destination device 198 determines a subsequent bit rate 215.

Method 500 includes step 540 when both (i) a subsequent bit rate of the communication channel, determined after generating the encoded bitstream (step 520), is less than a threshold value and (ii) the current bit rate exceeds the threshold value. In embodiments, memory 204 stores the subsequent bit rate and the threshold value as subsequent bit rate 215 and threshold bit rate 216 respectively.

Step 540 includes steps 542 and 548. Step 542 includes generating a downscaled reconstructed frame at least in part by reducing a resolution of either the current input video frame or the current reconstructed frame. In an example of step 542, encoder 224 generates downscaled reconstructed frame 236($t_0$+1) at least in part by reducing a resolution of input video frame 212($t_0$) or reconstructed frame 232($t_0$). In embodiments, downscaled frame 336($t$=3, c=2) is an example of downscaled reconstructed frame 236($t_0$+1).

Step 548 includes appending the encoded bitstream with a bit sequence representing the downscaled reconstructed frame. In embodiments, the bit sequence includes at least one of a motion vector and prediction error required to generate the downscaled reconstructed frame. The motion vector may have zero magnitude. In an example of step 548, video coding device 200 appends encoded bitstream 237 with a bit sequence 235. Bit sequence 235 includes at least one of a motion vector and prediction error required to generate the downscaled reconstructed frame produced in step 542 (downscaled reconstructed frame 236($t_0$+1)).

In embodiments, destination device 198 parses encoded bitstream 237 without motion compensation for inter-frame decoding. The motion vector may be encoded into encoded bitstream 237 and equal zero, or encoded bitstream 237 may lack a motion vector, in which case destination device 198, when parsing encoded bitstream 237, determines that the motion vector is zero when encoded bitstream 237 lacks a motion vector.

In embodiments, step 540 also includes step 545. Step 545 includes generating the bit sequence at least in part via inter-frame coding, without motion compensation, of a subsequent input video frame of the sequence of input video frames, using the current reconstructed frame as a reference frame. In an example of step 545, encoder 224 generates, as illustrated at encoder process 254 in FIG. 2, encoded bit sequence 235 at least in part via inter-frame coding, without motion compensation, of input video frame 212($t_0$+1), using reconstructed frame 232($t_0$) as a reference frame.

In embodiments, encoder process 254 also generates a downscaled input video frame 233($t_0$+1) based on input video frame 212($t_0$+1). Encoder 224 may use downscaled input video frame 233($t_0$+1) in step 542 and/or process 254, FIG. 2 when generating downscaled reconstructed frame 236($t_0$+1), such that at least one of encoded bit sequence 235 and downscaled reconstructed frame 236($t_0$+1) is determined by both reconstructed frame 232($t_0$) and downscaled input video frame 233($t_0$+1). Downscaled reconstructed frame 236($t_0$+1) may be an encoded image of downscaled input video frame 233($t_0$+1). When encoder process 254 generates input video frame 233, downscaled frame 336 ($t$=3, c=2) is an example of downscaled input video frame 233.

Step 590 includes at least one of (i) transmitting the encoded bitstream from the source device to the destination device and (ii) receiving the encoded bitstream sent from the source device to the destination device. In a first example of step 590, video coding device 200 transmits encoded bitstream 237 to destination device 198, which receives encoded bitstream 237.

In embodiments, method 500 also includes at least one of (a) steps 550 and 560, and (b) step 570. Step 550 is executed after step 548, and includes generating a subsequent reconstructed frame at least in part via inter-frame coding of a subsequent input video frame of the sequence of input video frames, using the downscaled reconstructed frame as a reference frame. Said inter-frame coding may include reducing a resolution of input video frames. In an example of step 550, encoder 224 generates, at encoder process 255, encoded bit sequence 238 and reconstructed frame 232($t$+2) at least in part via inter-frame coding of input video frame 212($t_0$+q) using downscaled reconstructed frame 236($t_0$+1), where q is a positive integer. In embodiments, q is greater than or equal to two, for example, q equals two or three.

In embodiments, the subsequent input video frame of step 550 is nonconsecutive to the current input video frame, which is input video frame 212($t_0$) in the example of step 520. In the example of step 550 input video frame 212($t_0$+q) is the subsequent input video frame, such that input video frame 212($t_0$+q) is nonconsecutive to input video frame 212($t_0$) when q≥2.

Video frame sequence 300, FIG. 3, is an example of when the subsequent input video frame of step 550 is nonconsecutive to the current input video frame. In video frame sequence 300, $t_0$=2 such that in the example of step 550 above, the time index of input video frame 212($t_0$+q) is t=4 when q=2. At time index t=4, video frame sequence 300 includes downscaled frame 336(t=4, c=4)), which is derived from content of input video frame 212(c=$t_0$+q=4). Downscaled frame 336(t=4, c=4) is an example of reconstructed frame 232($t_0$+2).

In embodiments, the subsequent input video frame of step 550 is consecutive to the current input video frame, which is input video frame 212($t_0$) in the example of step 520. In the example of step 550, input video frame 212($t_0$+q) is the subsequent input video frame, such that input video frame 212($t_0$+q) is consecutive to input video frame 212($t_0$) when q=1. Video frame sequence 400, FIG. 4, is an example of when the subsequent input video frame of step 550 is nonconsecutive to the current input video frame. In video frame sequence 400, FIG. 4, $t_0$=2 such that in the example of step 550 above, the time index of input video frame 212($t_0$+q) is t=3 when q=1. At time index t=4, video frame sequence 300 includes downscaled input frame 436(t=4, c=3), which is derived from content of input video frame 212(c=$t_0$+q=3). Downscaled input frame 436(t=4, c=3) is an example of reconstructed frame 232($t_0$+2).

Step 560 includes appending the encoded bitstream with a subsequent bit sequence that includes at least one of a motion vector and prediction error required to generate the subsequent reconstructed frame. In an example of step 560, video coding device 200 appends encoded bit sequence 238 to encoded bitstream 237. Encoded bit sequence 238 includes at least one of a motion vector and a prediction error required to generate reconstructed frame 232($t_0$+2). In a second example of step 590, video coding device 200 transmits encoded bitstream 239 to destination device 198.

When step 570 is executed after appending the encoded bitstream with the subsequent bit sequence and when the communication channel's bit rate exceeds the threshold value. Step 570 includes steps 572, 574, and 576. Step 572 includes upscaling the subsequent reconstructed frame. Herein, upscaling a frame may include increase the resolution of the frame. In an example of step 572, process group 220 upscales reconstructed frame 232($t_0$+2). Step 574 includes generating an additional subsequent reconstructed frame at least in part via inter-frame coding of a subsequent input video frame of the sequence of input video frames, using the upscaled subsequent reconstructed frame (i.e., subsequent reconstructed frame coded at original resolution) as a reference frame. In an example of step 574, process group 220 generates an additional subsequent reconstructed frame at least in part via inter-frame coding of (i) an input video frame 212 that is subsequent to input video frame 212($t_0$+q) of step 550, using (ii) the upscaled version of reconstructed frame 232($t_0$+2) resulting from step 572 as a reference frame. Step 576 includes appending the encoded bitstream, e.g., encoded bitstream 239, with an additional subsequent bit sequence that includes at least one of a motion vector and prediction error required to generate the additional subsequent reconstructed frame resulting from step 574.

Figure 6:
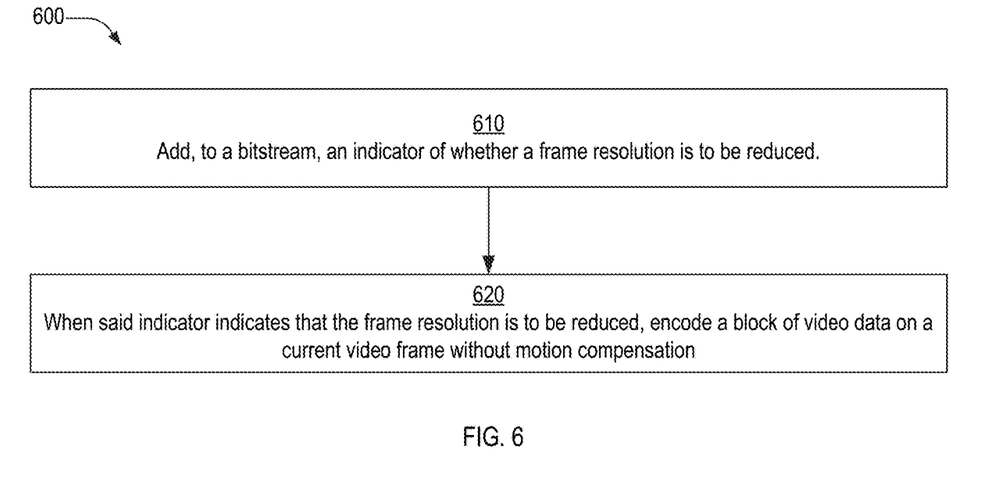
FIG. 6 is a flowchart illustrating a video encoding method, in an embodiment.

FIG. 6 is a flowchart illustrating a video encoding method 600. In embodiments, at least part of method 600 is implemented within one or more aspects of video streaming device 200. In embodiments, video encoding method 600 is implemented by processor 202 executing computer-readable instructions of process group 220. Method 600 includes steps 610 and 620.

Step 610 includes adding, to a bitstream, an indicator of whether a frame resolution is to be reduced. In an example of step 610, video coding device 200 adds an indicator to a bitstream that includes input video frames 212. Reconstructed frame 232($t_0$) is an example of the reference frame.

Step 620 includes, when the value of said indicator indicates is that the frame resolution is to be reduced, encoding a block of video data on a current video frame without motion compensation. Technical benefits of encoding without motion compensation include reduction of memory read from internal/external memory, power reduction due to the less memory access, and improved visual quality. In an example of step 620, when the value of said indicator indicates that that the frame resolution is to be reduced, video coding device 200 encodes, without motion compensation, a block of video data on a video frame 212($t_0$+1). Encoded bit sequence 235 is an example of the encoded block of data.

Method 600 may include additional implementations, such as any single implementation or any combination of implementations described below and/or in connection with one or more other processes described elsewhere herein.

In a first implementation, method 600 includes, when said indicator indicates that the frame resolution is to be reduced, indicating, in the bitstream, that a value motion vector is zero. In a second implementation, method 600 includes, when said indicator indicates that the frame resolution is to be reduced, inferring that the motion vector value equals zero when the bitstream does not include the motion vector.

In a third implementation, method 600 includes, when both (i) a subsequent bit rate of a communication channel, determined after said encoding, is less than a threshold value and (ii) a current bit rate exceeds the threshold value, setting a value of said indicator to true. In embodiments of the third implementation, method 600 also includes, when one of (i) the subsequent bit rate exceeds the threshold value and (ii) the current bit rate is less than the threshold value: setting the value of said indictor to false.

In a fourth implementation, method 600 includes determining the current bit rate (e.g., current bit rate 214), and after said determining the current bit rate, generating an encoded bitstream, and after generating the encoded bitstream, determining the subsequent bit rate (e.g., subsequent bit rate 215).

Although FIG. 6 shows example steps of method 600, in some implementations, method 600 may include additional steps, fewer steps, different steps, or differently arranged steps than those depicted in FIG. 6. Additionally, or alternatively, two or more of the steps of method 600 may be performed in parallel.

Figure 7:
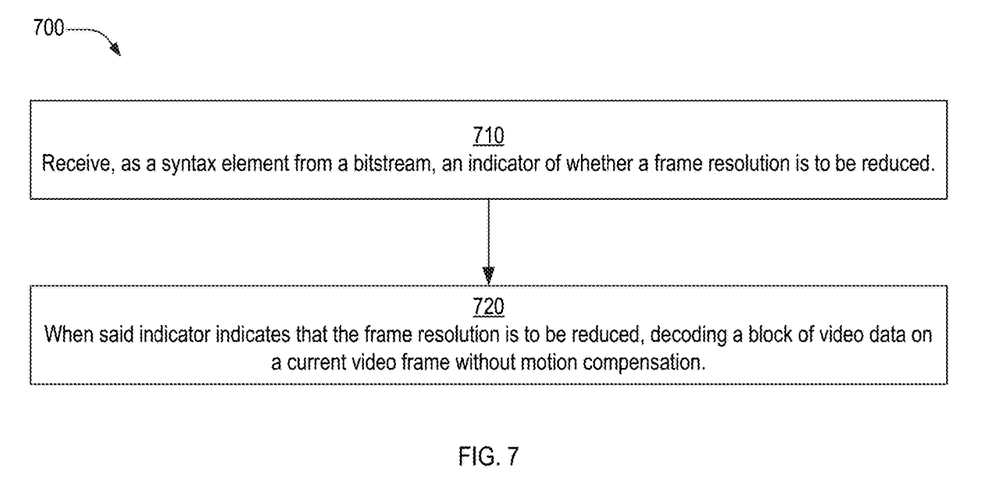
FIG. 7 is a flowchart illustrating a video decoding method, in an embodiment.

FIG. 7 is a flowchart illustrating a video decoding method 700. In embodiments, at least part of method 700 is implemented within one or more aspects of destination device 198. Method 700 includes steps 710 and 720.

Step 710 includes receiving, as a syntax element from a bitstream, an indicator of whether a frame resolution is to be reduced. For example, destination device 198 may receive an indication as a syntax element from encoded bitstream 237. Said indication indicates of whether a frame resolution is to be reduced. Step 720 includes, when said indicator indicates that the frame resolution is to be reduced, decoding a block of video data on a current video frame without motion compensation.

Although FIG. 7 shows example steps of method 700, in some implementations, method 700 may include additional steps, fewer steps, different steps, or differently arranged steps than those depicted in FIG. 7. Additionally, or alternatively, two or more of the steps of method 700 may be performed in parallel.

Combinations of Features

Features described above as well as those claimed below may be combined in various ways without departing from the scope hereof. The following enumerated examples illustrate some possible, non-limiting combinations.

(A1) A video coding method includes (A) determining a current bit rate of a time-varying bit rate of a communication channel between a destination device and a source device that stores at least one input video frame of a sequence of input video frames; and (B) generating a current reconstructed frame and an encoded bitstream at least in part via inter-frame coding of a current input video frame of the sequence of input video frames using a previously-generated reconstructed frame generated at least in part via inter-frame coding of a previous input video frame of the sequence of input video frames, the current reconstructed frame being a compressed version of the current input video frame. The current reconstructed frame is a compressed version of the current input video frame. When both (i) a subsequent bit rate of the communication channel, determined after said inter-frame coding, is less than a threshold value and (ii) the current bit rate exceeds the threshold value: (a) generating a downscaled reconstructed frame at least in part by downscaling the current reconstructed frame; and (b) appending the encoded bitstream with a bit sequence representing the downscaled reconstructed frame. The method may also include at least one of transmitting the encoded bitstream from the source device to the destination device and receiving the encoded bitstream sent from the source device to the destination device.

(A2) In embodiments of method (A1), said determining the current bit rate preceding said generating the encoded bitstream, which precedes said determining the subsequent bit rate.

(A3) Embodiments of either one of methods (A1) and (A2) further include generating the bit sequence at least in part via inter-frame coding, without motion compensation, of a subsequent input video frame of the sequence of input video frames using the current reconstructed frame.

(A4) Embodiments of any one of methods (A1)-(A3) further include after appending the encoded bitstream: generating a subsequent reconstructed frame at least in part via inter-frame coding of a subsequent input video frame of the sequence of input video frames using the downscaled reconstructed frame; and appending the encoded bitstream with a subsequent bit sequence that includes at least one of a motion vector and prediction error required to generate the subsequent reconstructed frame.

(A5) In embodiments of method (A4) the subsequent input video frame is nonconsecutive to the current input video frame.

(A6) In embodiments of method (A5) the sequence of input video frames includes just one frame between the current input video frame and the subsequent input video frame.

(A7) In embodiments of method (A4), the subsequent input video frame is consecutive to the current input video frame.

(A8) Embodiments of any one of methods (A4)-(A7) further include after appending the encoded bitstream with the subsequent bit sequence and when the communication channel's bit rate exceeds the threshold value: upscaling the subsequent reconstructed frame; generating an additional subsequent reconstructed frame at least in part via inter-frame coding of a subsequent input video frame of the sequence of input video frames, using the upscaled subsequent reconstructed frame as a reference frame; and appending the encoded bitstream with an additional subsequent bit sequence that includes at least one of a motion vector and prediction error required to generate the additional subsequent reconstructed frame.

(A9) In embodiments of any one of methods (A1)-(A8), generating the encoded bitstream includes computing a motion vector between the previously-generated reconstructed frame and the current video input frame; and generating the encoded bitstream from the motion vector, the current video input frame, and the previously-generated reconstructed frame at least in part via inter-frame coding.

(A10) Embodiments of any one of methods (A1)-(A9), further include, when both (i) the subsequent bit rate is less than the threshold value and (ii) the current bit rate exceeds the threshold value: downscaling the current input video frame to yield a downscaled input video frame; and generating the downscaled reconstructed frame comprising encoding the downscaled input video frame to yield the downscaled reconstructed frame.

(B1) A video coding device includes a processor and a memory. The memory stores non-transitory computer-readable instructions that, when executed by the processor, control the processor execute any one of methods (A1)-(A9).

(B2) Embodiments of the device (B1) further include a buffer memory that is communicatively coupled to the memory and storing the previously-generated reconstructed frame.

(B3) Embodiments of the either one of devices (B1) and (B2) further include an image sensor communicatively coupled to the memory.

(B4) Embodiments of device (B3) further include a camera communicatively coupled to the memory and configured to generate the sequence of input video frames. The image sensor is part of the camera.

(C1) A video encoding method includes adding, to a bitstream, an indicator of whether a frame resolution is to be reduced; and when said indicator indicates that the frame resolution is to be reduced, encoding a block of video data on a current video frame without motion compensation.

(C2) Embodiments of method (C1) include, when said indicator indicates that the frame resolution is to be reduced: indicating zero motion vector value in the bitstream.

(C3) Embodiments of either one of methods (C1) and (C2) include, when said indicator indicates that the frame resolution is to be reduced: inferring motion vector value as zero without indicating in a bitstream.

(C4) Embodiments of any one of methods (C1)-(C3) include when both (i) a subsequent bit rate of a communication channel, determined after said encoding, is less than a threshold value and (ii) a current bit rate exceeds the threshold value: setting a value of said indicator to true.

(C5) Embodiments of method (C4) include, when one of (i) the subsequent bit rate exceeds the threshold value and (ii) the current bit rate is less than the threshold value: setting the value of said indictor to false.

(C6) Embodiments of either one of methods (C4) and (C5) include, determining the current bit rate; after said determining the current bit rate, generating an encoded bitstream; and after generating the encoded bitstream, determining the subsequent bit rate.

(D1) A video decoding method includes: receiving, as a syntax element from a bitstream, an indicator of whether a frame resolution is to be reduced. The method also includes, when said indicator indicates that the frame resolution is to be reduced, decoding a block of video data on a current video frame without motion compensation.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween

What is claimed is:

1. A video encoding method comprising:
determining a current bit rate of a time-varying bit rate of a communication channel between a destination device and a source device that stores at least one input video frame of a sequence of input video frames;
generating a current reconstructed frame and an encoded bitstream at least in part via inter-frame coding of a current input video frame of [the sequence of input video frames using a previously-generated reconstructed frame generated at least in part via inter-frame coding of a previous input video frame of the sequence of input video frames, the current reconstructed frame being a compressed version of the current input video frame; and
when both (i) a subsequent bit rate of the communication channel, determined after said inter-frame coding of the current input video frame of the sequence of input video frames, is less than a threshold value and (ii) the current bit rate exceeds the threshold value: (a) generating a downscaled reconstructed frame at least in part by reducing a resolution of the current input video frame; and (b) appending the encoded bitstream with a bit sequence representing the downscaled reconstructed frame.

2. The video coding method of claim 1, said determining the current bit rate following said generating the encoded bitstream, which is followed by said determining the subsequent bit rate.

3. The video coding method of claim 1, further comprising
generating the bit sequence at least in part via inter-frame coding, without motion compensation, of a subsequent input video frame of the sequence of input video frames using the current reconstructed frame as a reference frame.

4. The video coding method of claim 1, further comprising, after appending the encoded bitstream:
generating a subsequent reconstructed frame at least in part via inter-frame coding of a subsequent input video frame of the sequence of input video frames using the downscaled reconstructed frame as a reference frame; and
appending the encoded bitstream with a subsequent bit sequence that includes at least one of a motion vector and prediction error required to generate the subsequent reconstructed frame.

5. The video coding method of claim 4, the subsequent input video frame being nonconsecutive to the current input video frame.

6. The video coding method of claim 5, between the input video frame and the subsequent input video frame, the sequence of input video frames including just one frame.

7. The video coding method of claim 4, the subsequent input video frame being consecutive to the current input video frame.

8. The video coding method of claim 4, further comprising, after appending the encoded bitstream with the subsequent bit sequence and when the communication channel's bit rate exceeds the threshold value:
upscaling the subsequent reconstructed frame at least in part by increasing resolution of the subsequent reconstructed frame;
generating an additional subsequent reconstructed frame at least in part via inter-frame coding of the upscaled subsequent reconstructed frame using the subsequent input video frame as a reference frame; and
appending the encoded bitstream with an additional subsequent bit sequence that includes at least one of a motion vector and prediction error required to generate the additional subsequent reconstructed frame.

9. The video coding method of claim 1, generating the encoded bitstream further comprising:
computing a motion vector between the previously-generated reconstructed frame and the current video input frame; and
generating the encoded bitstream from the motion vector, the current video input frame, and the previously-generated reconstructed frame at least in part via inter-frame coding.

10. The video coding method of claim 1, further comprising,
when both (i) the subsequent bit rate is less than the threshold value and (ii) the current bit rate exceeds the threshold value: downscaling the current input video frame to yield a downscaled input video frame; and
generating the downscaled reconstructed frame further comprising encoding the downscaled input video frame to yield the downscaled reconstructed frame.

11. A video coding device comprising: a processor; a memory storing non-transitory computer-readable instructions that, when executed by the processor, control the processor to:
determine a current bit rate of a time-varying bit rate of a communication channel between a destination device and the video coding device;
generate a current reconstructed frame and an encoded bitstream at least in part via inter-frame coding of a current input video frame of a sequence of input video frames using a previously-generated reconstructed frame generated at least in part via inter-frame coding of a previous input video frame of the sequence of input video frames, the current reconstructed frame being a compressed version of the current input video frame;
when both (i) a subsequent bit rate of the communication channel, determined after said inter-frame coding of the current input video frame of the sequence of input video frames, is less than a threshold value and (ii) the current bit rate exceeds the threshold value: (a) downscale the current reconstructed frame to yield a downscaled reconstructed frame; and (b) append the encoded bitstream with a bit sequence representing the downscaled reconstructed frame.

12. The video coding device of claim 11, further comprising a buffer memory that is communicatively coupled to the memory and storing the previously-generated reconstructed frame.

13. The video coding device of claim 11, further comprising an image sensor communicatively coupled to the memory.

14. The video coding device of claim 11, further comprising a camera communicatively coupled to the memory and configured to generate the sequence of input video frames, the image sensor being part of the camera.

15. The video coding device of claim 11, further comprising instructions that, when executed by the processor, control the processor to generate the bit sequence at least in part via inter-frame coding, without motion compensation, of (i) a subsequent input video frame of the sequence of input video frames and (ii) the current reconstructed frame.

16. The video coding device of claim 11, further comprising instructions that, when executed by the processor, control the processor to:
generate a subsequent reconstructed frame at least in part via inter-frame coding of a subsequent input video frame of the sequence of input video frames using the downscaled reconstructed frame; and
append the encoded bitstream with a subsequent bit sequence that includes at least one of a motion vector and prediction error required to generate the subsequent reconstructed frame.

17. The video coding device of claim 16, the subsequent input video frame being nonconsecutive to the current input video frame.

18. The video coding device of claim 17, the sequence of input video frames including just one frame between the current input video frame and the subsequent input video frame.

19. The video coding device of claim 16, the subsequent input video frame being consecutive to the current input video frame.

20. The video coding device of claim 16, further comprising instructions that, when executed by the processor, control the processor to:
upscale the subsequent reconstructed frame;
generate an additional subsequent reconstructed frame at least in part via inter-frame coding of (i) the upscaled subsequent reconstructed frame and (ii) a subsequent input video frame of the sequence of input video frames; and
append the encoded bitstream with an additional subsequent bit sequence that includes at least one of a motion vector and prediction error required to generate the additional subsequent reconstructed frame.

21. The video coding device of claim 11, further comprising instructions that, when executed by the processor, control the processor to:
compute a motion vector between the previously-generated reconstructed frame and the current video input frame; and
generate the encoded bitstream from the motion vector, the current video input frame, and the previously-generated reconstructed frame at least in part via inter-frame coding.

22. The video coding device of claim 11, further comprising instructions that, when executed by the processor, and when both (i) the subsequent bit rate is less than the threshold value and (ii) the current bit rate exceeds the threshold value, control the processor to:
downscale the current input video frame to yield a downscaled input video frame;
and, when generating the downscaled reconstructed frame, encode the downscaled input video frame to yield the downscaled reconstructed frame.

\* \* \* \* \*